United States Patent
Ikeda

(10) Patent No.: US 7,990,584 B2
(45) Date of Patent: Aug. 2, 2011

(54) ROD-SHAPED LIGHT GUIDE AND IMAGE READING DEVICE

(75) Inventor: Makoto Ikeda, Minato-ku (JP)

(73) Assignee: Nippon Sheet Glass Co., Ltd., Tokyo (JP)

( * ) Notice: Subject to any disclaimer, the term of this patent is extended or adjusted under 35 U.S.C. 154(b) by 221 days.

(21) Appl. No.: 12/345,181

(22) Filed: Dec. 29, 2008

(65) Prior Publication Data

US 2009/0310190 A1   Dec. 17, 2009

(30) Foreign Application Priority Data

Jun. 16, 2008 (JP) ................................ 2008-157218

(51) Int. Cl.
*H04N 1/04* (2006.01)
(52) U.S. Cl. ........ 358/484; 358/475; 358/482; 358/483; 358/474
(58) Field of Classification Search .................. 358/484, 358/483, 482, 475, 509; 250/208.1, 227.11, 250/216; 355/67, 68; 362/615
See application file for complete search history.

(56) References Cited

U.S. PATENT DOCUMENTS 5,499,112 A * 3/1996 Kawai et al. .................. 358/475
6,295,141 B1 * 9/2001 Ogura et al. .................. 358/475

FOREIGN PATENT DOCUMENTS

JP        2006-148501 A       6/2006

* cited by examiner

*Primary Examiner* — Cheukfan Lee
(74) *Attorney, Agent, or Firm* — Sughrue Mion, PLLC

(57) ABSTRACT

A rod-shaped light guide reflects light incident on an end face thereof in the interior of the rod-shaped light guide and emits the light outside from a light emitting surface provided to extend in the longitudinal direction. The rod-shaped light guide includes: a scattering pattern surface provided to be opposite to the light emitting surface and operative to scatter the light incident on the end face; first and second lateral surfaces provided between the light emitting surface and the scattering pattern surface; and first and second projections provided to project from the first and second lateral surfaces, respectively, capture the light reflected by the light emitting surface, reflects the light toward the light emitting surface, and causes the light to be emitted outside from the light emitting surface.

8 Claims, 4 Drawing Sheets

ROD-SHAPED LIGHT GUIDE AND IMAGE READING DEVICE

BACKGROUND OF THE INVENTION

1. Field of the Invention

The present invention relates to a rod-shaped light guide operative to receive light at an end face and emit light at a predetermined emitting surface, and to an image reading device having a rod-shaped light guide built therein.

2. Description of the Related Art

Facsimile machines, copiers, and scanners have a built-in image reading device provided with a rod-shaped light guide for illuminating a document with a line light and with a lens array for condensing light reflected from the document onto a line image sensor.

In such an image reading device, a rod-shaped light guide is required to illuminate a document with an amount of light sufficient to read the document. To address this requirement, there is disclosed a technology whereby a rod-shaped light guide is loaded in a white light guide case such that the surface emitting light is exposed (see, for example, patent document No. 1). By loading a rod-shaped light guide in a light guide case, light that leaks from the surface other than the light emitting surface is reflected by the light guide case and returned to the interior of the rod-shaped light guide. Thereby, light loss is reduced and the amount of emitted light is increased accordingly. [[patent document No. 1] JP 2006-148501

By loading a rod-shaped light guide in a light guide case to efficiently use light that leaks from the rod-shaped light guide, the number of components is increased and the step of loading the rod-shaped light guide in the light guide case is required with the result that the cost is increased.

SUMMARY OF THE INVENTION

In this background, a general purpose of the present invention is to provide a rod-shaped light guide and an image reading device using the rod-shaped light guide capable of increasing the amount of emitted light without using a light guide case.

The rod-shaped light guide according to at least one embodiment of the present invention reflects light incident on an end face thereof in the interior of the rod-shaped light guide and emits the light outside from a light emitting surface provided to extend in the longitudinal direction, and comprises: a scattering pattern surface provided to be opposite to the light emitting surface and operative to scatter the light incident on the end face; a lateral surface provided between the light emitting surface and the scattering pattern surface; and a projection provided to project from the lateral surface, capture the light reflected by the light emitting surface, reflects the light toward the light emitting surface, and causes the light to be emitted outside from the light emitting surface.

According to this embodiment, by providing a projection in the lateral surface to capture the light reflected by the light emitting surface, reflect the light toward the light emitting surface, and cause the light to be emitted outside from the light emitting surface, light can be effectively used without using a light guide case, with the result that the amount of emitted light is increased. Since the number of components or the number of assembly steps is reduced, inexpensive rod-shaped light guides can be provided.

The projection may be formed such that the cross section thereof perpendicular to the longitudinal direction of the rod-shaped light guide is uniform over the entire length thereof in the longitudinal direction. By forming the projections in this way, the amount of emitted light is increased over the entire length in the longitudinal direction of the rod-shaped light guide.

The projection may be formed to project at an angle toward the scattering pattern surface away from the light emitting surface. The projection may be formed to reflect light in a direction different from the direction in which the light is incident on the projection. The projection may be formed so that the reflected light is incident on the light emitting surface at an incidence angle smaller than the critical angle of the light emitting surface. The projection may be formed such that the cross section thereof perpendicular to the longitudinal direction of the rod-shaped light guide is rectangular. In these cases, the projections can suitably capture light reflected by the light emitting surface and reflect the captured light toward the light emitting surface so that the light emitting surface emits the reflected light outside.

A plurality of projections may be provided in the lateral surface. In this case, the amount of emitted light can be increased as compared to a case where only one projection is formed. The plurality of projections may be symmetrical with respect to the central plane of the rod-shaped light guide extending in the longitudinal direction. This ensures that distribution of emitted light is symmetrical with respect to the central plane.

Another embodiment of the present invention relates to an image reading device. The image reading device comprises: the aforementioned rod-shaped light guide for illuminating a document with light; a lens array operative to condense the light emitted by the rod-shaped light guide and reflected by the document; and a line image sensor operative to receive the light condensed by the lens array.

According to the embodiment, the amount of light radiated by the rod-shaped light guide and illuminating the document can be increased so that an image reading device with improved image reading capabilities can be formed.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 4A-4H are diagrams related to variations of the rod-shaped light guide.

DETAILED DESCRIPTION OF THE INVENTION

The invention will now be described by reference to the preferred embodiments. This does not intend to limit the scope of the present invention, but to exemplify the invention.

A description will now be given of the best mode of practicing the present invention with reference to the accompanying drawings.

Figure 1:
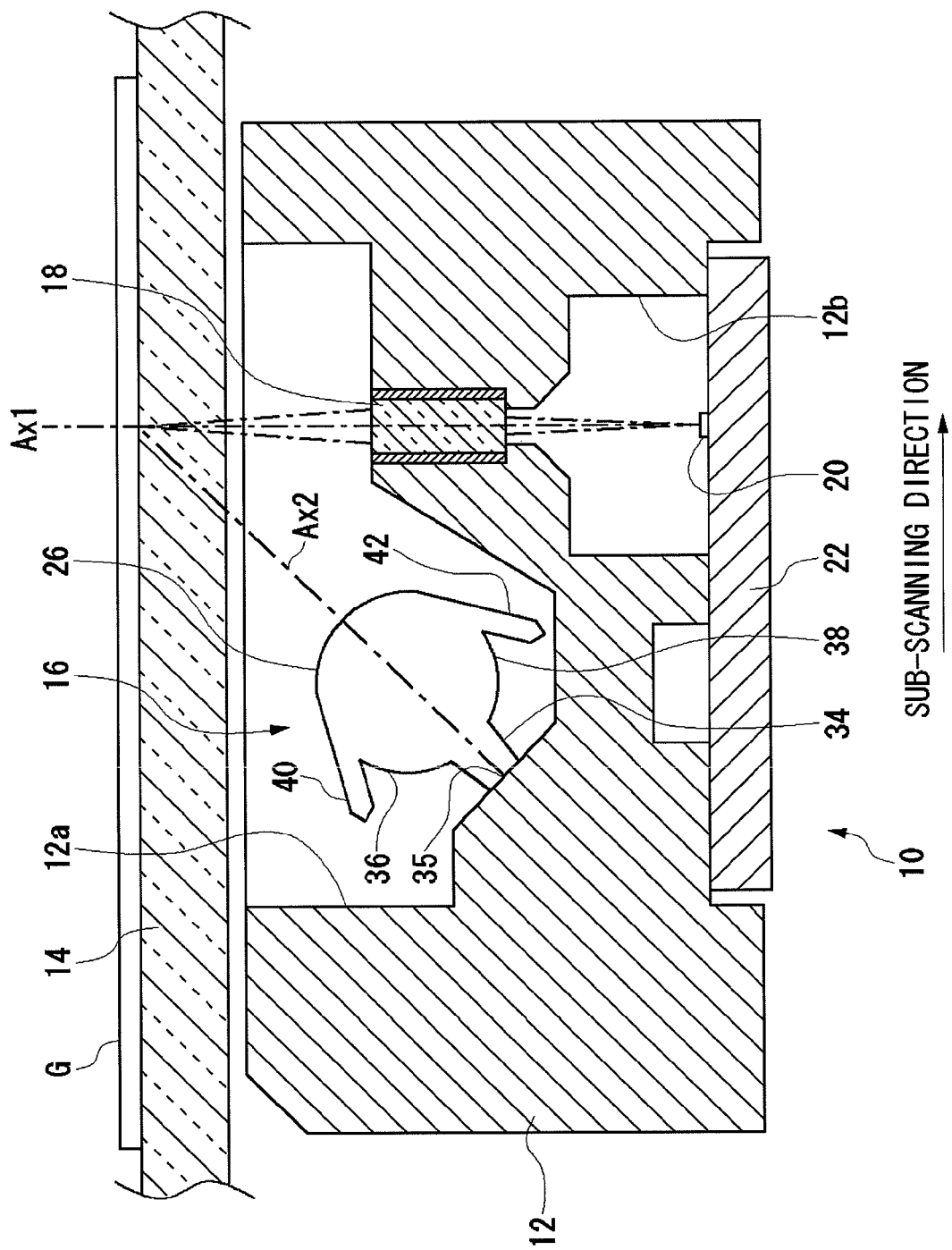
FIG. 1 is a sectional view of an image reading device according to an embodiment of the present invention.

FIG. 1 is a sectional view of an image reading device 10 according to an embodiment of the present invention. As shown in FIG. 1, the image reading device 10 comprises a frame (housing) 12, a glass plate 14 for placing a document G, a line illuminator 16 for illuminating the document G with light, a rod lens array 18 for condensing light from the document G, and a line image sensor (photoelectric transducer) 20 for receiving light condensed by the rod lens array 18. The line illuminator 16 comprises a rod-shaped light guide 26.

A recess 12a is formed in the upper part of the frame 12 and a recess 12b is formed in the lower part. The line illuminator 16 is diagonally fixed inside the recess 12a. The line illuminator 16 is fixed such that the optical axis Ax2 of the illuminating light passes through the intersection between the optical axis Ax of the rod lens array 18 and the top surface of the glass plate 14. The top of the recess 12a is covered by the glass plate 14. A substrate 22 provided with the line image sensor 20 is fitted in the recess 12b in the lower part. The rod lens array 18 is secured between the recess 12a and the recess 12b of the frame 12.

In the image reading device 10, the light emitted by the line illuminator 16 irradiates the document G via the glass plate 14 and the light reflected by the document G is detected by the line image sensor 20 via the rod lens array 18 so that the document G is read accordingly. By scanning the frame 12 in the sub-scanning direction with respect to the glass plate 14, desired areas of the document G can be read.

Figure 2:
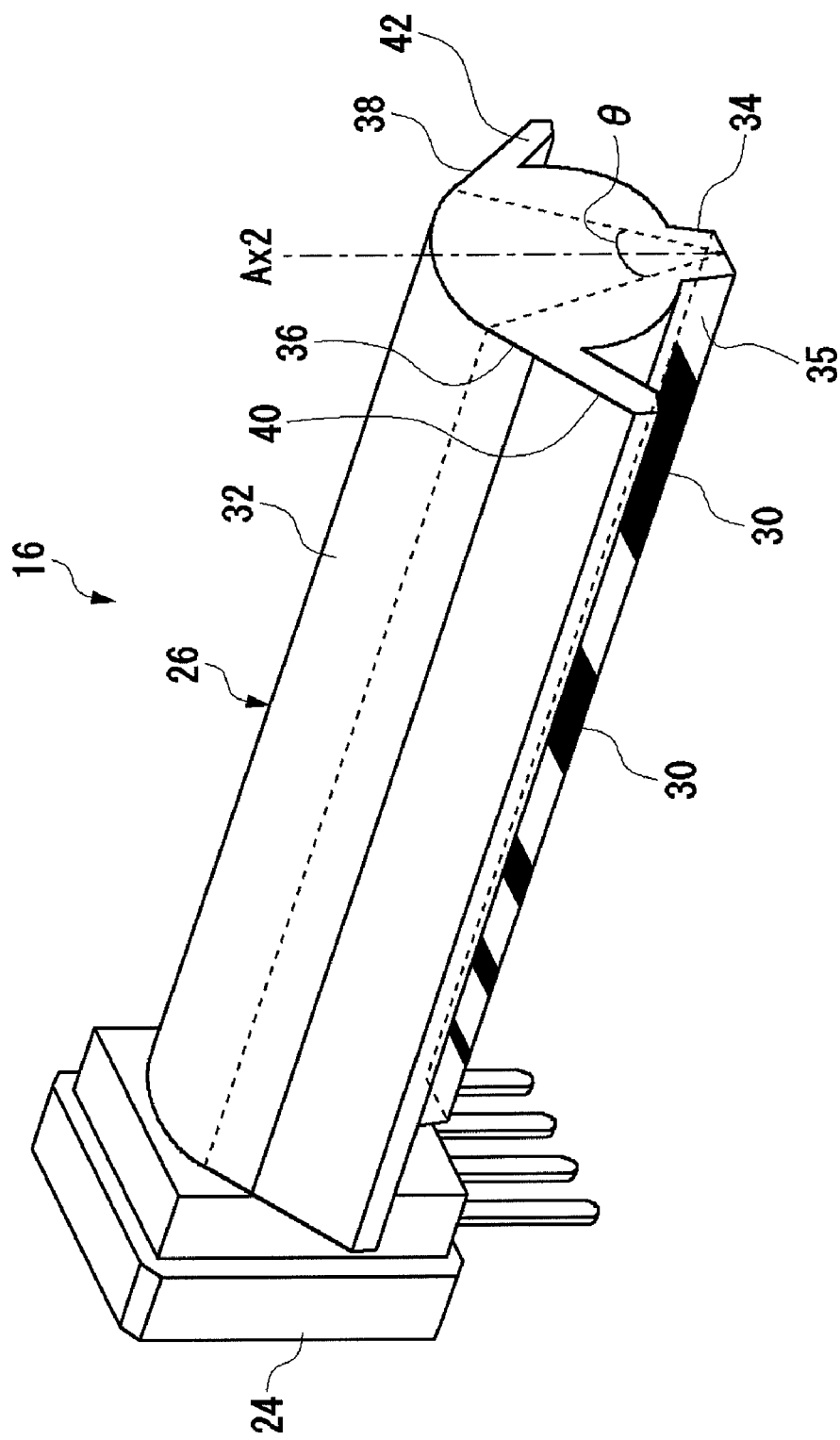
FIG. 2 is a perspective view of a line illuminator.

FIG. 2 is a perspective view of the line illuminator 16. As shown in FIG. 2, the line illuminator 16 is configured such that a light-emitting unit 24 is provided at one end of the rod-shaped light guide 26. The light-emitting unit 24 is provided with three light-emitting elements (not shown) for emitting red, green, and blue light, respectively. The light-emitting element may be an LED.

The rod-shaped light guide 26 is formed by extrusion molding a transparent resin such as acryl. The cross section thereof is substantially circular. A scattering pattern part 34 having a trapezoidal cross section is formed to project from the lower end of the rod-shaped light guide 26. Light scattering patterns 30 for scattering light incident on the end face of the rod-shaped light guide 26 are formed by, for example, screen printing a bottom 35 of the scattering pattern part 34 with a while coating material. The bottom 35 may be referred to as the scattering pattern surface 35.

The light scattering patterns 30 are formed such that the farther away from the light-emitting unit 24, the larger the area of the pattern. In the illustrated example, the light scattering patterns 30 are formed such that the farther away from the light-emitting unit 24, the larger the width of the pattern in the longitudinal direction. The light scattering patterns 30 may be formed such that the farther away from the light-emitting unit 24, the larger the width of the pattern in the lateral direction. What is essential is that, by ensuring that the farther away from the plane of incidence, the larger the area of the light scattering pattern 30, the light emitted by a light emitting surface 32 is uniformly distributed over the entire length in the longitudinal direction (i.e., main-scanning direction occurring when the illuminator is installed in the image reading device 10).

The surface of the rod-shaped light guide 26 facing the scattering pattern surface 35 represents a light emitting surface 32 for emitting light scattered by the light scattering patterns 30 outside. The light emitting surface 32 is provided to extend in the longitudinal direction. The light emitting surface 32 is defined according to a predetermined area (also referred to as a read area) on the document G that requires illumination in the image reading device 10. Since the rod-shaped light guide 26 according to the embodiment is formed to have a substantially circular cross section, the boundaries (marked by broken lines in FIG. 2) of the light emitting surface 32 in the lateral direction are not precisely defined. For example, light may be emitted from areas outside the light emitting surface 32. In this regard, the light emitting surface according to the embodiment is defined as an area illuminating the predetermined area on the document G and radiating light that is validly used for reading.

In this embodiment, the light emitting surface 32 is defined by a predetermine illumination angle θ. The illumination angle θ is formed by two straight lines drawn from the intersection of an optical axis Ax2 of the rod-shaped light guide 26 and the scattering pattern surface 35 to the edges of the light emitting surface 32. In the illustrated example, the illumination angle θ is set to approximately 60°.

Between the light emitting surface 32 and the scattering pattern surface 35 are provided a first lateral surface 36 and a second lateral surface 38. The first lateral surface 36 and the second lateral surface 38 are symmetrical with respect to the central plane of the rod-shaped light guide 26 extending in the longitudinal direction. The central plane of the rod-shaped light guide 26 extending in the longitudinal direction is a planer intersecting the scattering pattern part 34 at right angles along the lateral center and contains the optical axis Ax2.

In this embodiment, the first lateral surface 36 and the second lateral surface 38 are provided with a first projection 40 and a second projection 42, respectively. The first projection 40 and the second projection 42 captures light reflected by the light emitting surface 32 and reflects the light toward the light emitting surface 32 so that the light emitting surface 32 emits the light outside.

As shown in FIGS. 1 and 2, the first projection 40 and the second projection 42 are formed such that the cross section thereof perpendicular to the longitudinal direction of the rod-shaped light guide 26 is rectangular and formed to project at an angle toward the scattering pattern surface 35 away from a direction of the light emitting surface 32. The end of the first projection 40 and the second projection 42 is chamfered and formed to have a triangular cross section. The first projection 40 and the second projection 42 are formed to reflect light in a direction different from the direction in which the light is incident on the projection. The first projection 40 and the second projection 42 are formed so that the reflected light is incident on the light emitting surface 32 at an incidence angle smaller than the critical angle of the light emitting surface 32. By configuring the projections in this way, the projections can suitably capture light reflected by the light emitting surface 32 and reflect the captured light toward the light emitting surface 32 so that the light emitting surface 32 emits the reflected light outside.

The first projection 40 and the second projection 42 are symmetrical with respect to the central plane of the rod-shaped light guide 26 extending in the longitudinal direction. This ensures that the distribution of the amount of emitted light is symmetrical with respect to the central plane. In this embodiment, the first projection 40 projects from the 9 o'clock position in the circular portion of the rod-shaped light guide 26 in a direction tangential to the 9 o'clock position, the second projection 42 projects from the 3 o'clock position in a direction tangential to the 3 o'clock position, given that the 12 o'clock position is defined as the intersection between the optical axis Ax2 and the light emitting surface 32. As shown in FIG. 2, the first projection 40 and the second projection 42 are formed such that the cross section thereof perpendicular to the longitudinal direction of the rod-shaped light guide 26 is uniform over the entire length thereof in the longitudinal direction. By forming the projections in this way, the amount of emitted light is increased over the entire length in the longitudinal direction of the rod-shaped light guide 26.

Figure 3:
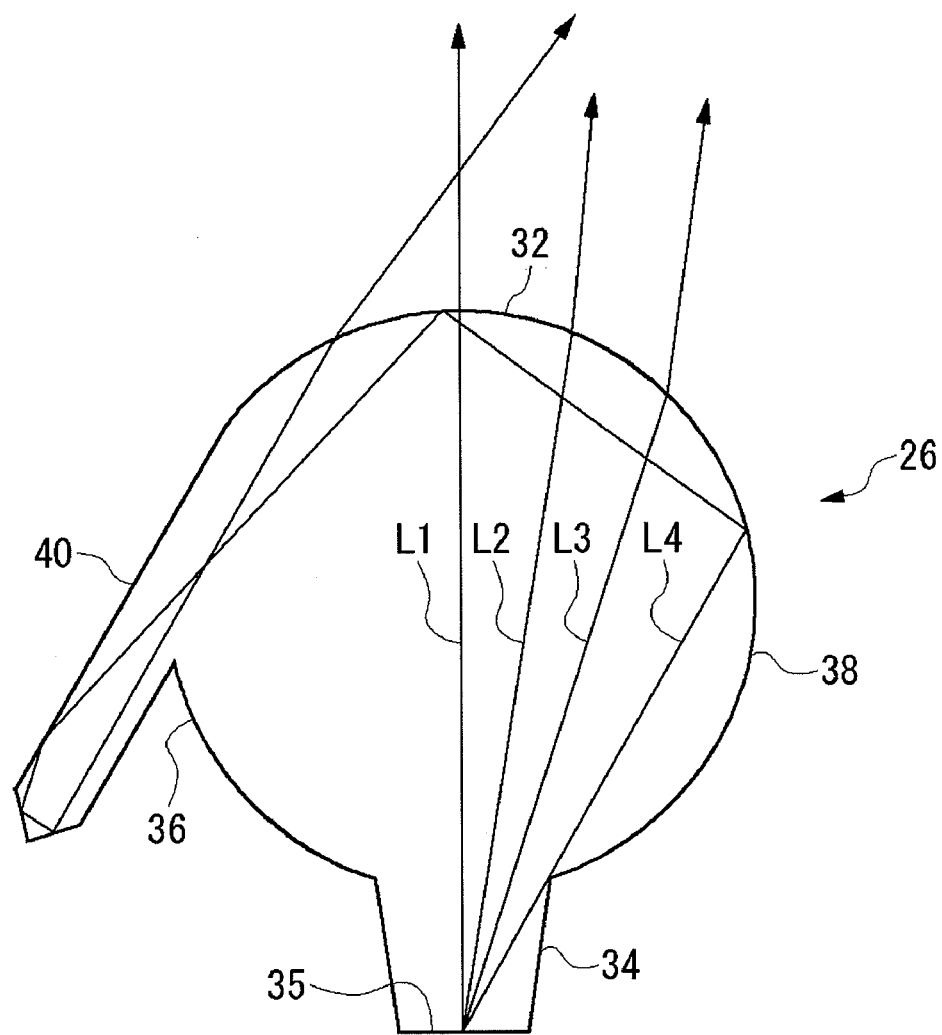
FIG. 3 shows the trajectory of beams in a rod-shaped light guide according to an embodiment of the present invention.

FIG. 3 shows the trajectory of beams in the rod-shaped light guide 26 according to the embodiment. The light output from the light-emitting unit 24 and incident on the end face of the rod-shaped light guide 26 is transmitted in the longitudinal direction as the light is repeatedly reflected in the rod-shaped light guide 26. When the light impinges upon the light scattering pattern 30 formed in the scattering pattern surface 35, the light is scattered in various directions. In the illustration, the trajectory of light scattered in various directions by the scattering pattern surface 35 is represented by four beams L1-L4. In FIG. 3, illustration of the second projection 42 is omitted for brevity.

As shown in FIG. 3, the angle of incidence on the light emitting surface 32 of the beams L1-L3 is smaller than the critical angle so that the beams are emitted outside from the light emitting surface 32. Meanwhile, the beam L4 is initially reflected by the second lateral surface 38 and then incident on the light emitting surface 32. Since the angle of incidence on the light emitting surface 32 is larger than the critical angle, the beam is totally reflected. The beam L4 totally reflected by the light emitting surface 32 is guided into the first projection 40. The beam L4 incident on the first projection 40 is repeatedly reflected by the lateral surface and the triangular end of the first projection 40 and then emitted from the first projection 40 in a direction different from the direction in which the beam is incident on the projection 40. The beam L4 reflected by the first projection 40 is incident on the light emitting surface 32 at an angle of incidence smaller than the critical angle, the beam is not reflected and emitted outside from the light emitting surface 32. The light incident on the second projection 42 (not shown in FIG. 3) is similarly reflected inside the second projection 42 and emitted outside by the light emitting surface 32.

Assuming that the first projection 40 is not provided and the first lateral surface 36 is merely formed as an arc-shaped lateral surface, the light totally reflected by the light emitting surface 32, such as the beam L4, will leak outside from the first lateral surface 36 or the scattering pattern part 34 after being reflected inside the rod-shaped light guide 26 repeatedly. Thus, the light cannot be emitted from the light emitting surface 32. In other words, the light from the light-emitting unit 24 is not effectively used. If the rod-shaped light guide 26 is accommodated in a light guide case to use the light leaking from the lateral surface 36 or the scattering pattern part 34 effectively, the number of components is increased and the step of loading the rod-shaped light guide 26 in the light guide case is required, with the result that the cost is increased.

By providing the first projection 40 in the first lateral surface 36 and providing the second projection 42 in the second lateral surface 38, at least a portion of the light initially totally reflected by the light emitting surface 32 of the rod-shaped light guide 26 according to the embodiment is emitted from the light emitting surface 32. Therefore, the light from the light-emitting unit 24 can be effectively used and the amount of light emitted from the light emitting surface 32 is increased without using a light guide case.

Since the first projection 40 and the second projection 42 can be formed to be integral with the rod-shaped light guide 26 by extrusion molding, the number of components or the number of assembly steps is not increased so that the rod-shaped light guide 26 can be manufactured at a low cost.

If a light guide case is used, the illumination characteristics of the rod-shaped light guide 26 may vary depending on the dimensional tolerance of the light guide case or the assembly tolerance occurring when the rod-shaped light guide is loaded in the light guide case. In the case of the embodiment, the projections can be formed to be integral with the main body of the rod-shaped light guide 26 with the result that the dimensional tolerance is reduced and the assembly tolerance is eliminated. Accordingly, the rod-shaped light guide 26 with stable illumination characteristics can be provided.

Figure 4A:
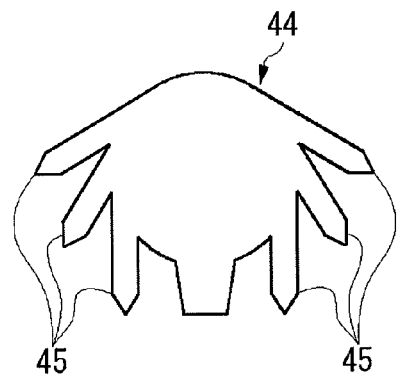
Figure 4B:
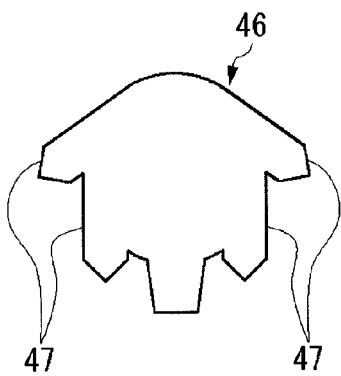
Figure 4C:
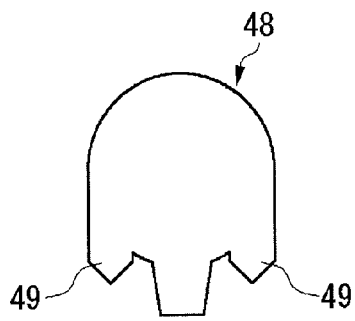
Figure 4D:
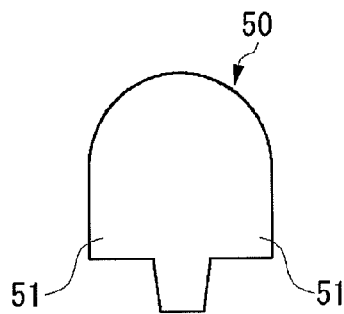
Figure 4D:
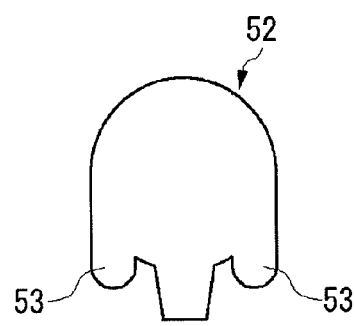
Figure 4F:
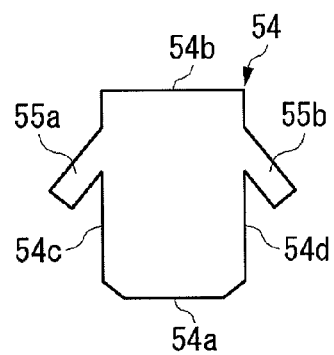
Figure 4F:
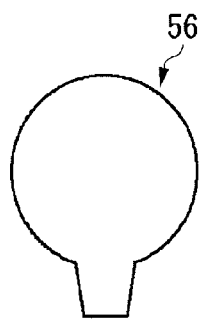
Figure 4H:
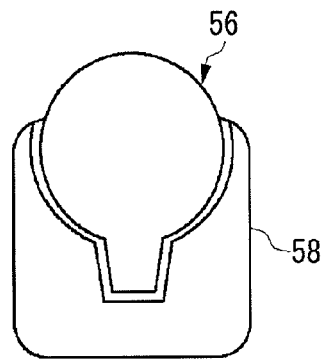

FIGS. 4A-4H are diagrams related to variations of the rod-shaped light guide. FIGS. 4A-4F show variations of the rod-shaped light guide. FIG. 4G shows a rod-shaped light guide 56 according to a comparative example in which projections are not provided in the lateral surfaces. FIG. 4h shows how the rod-shaped light guide 56 of FIG. 4G is loaded in a light guide case 58.

FIG. 4A shows a rod-shaped light guide 44 in which six projections 45 are provided in the lateral surfaces. By increasing the number of projections, more of the light initially totally reflected by the light emitting surface can be emitted from the light emitting surface with the result that the amount of emitted light is increased.

FIGS. 4B and 4C show rod-shaped light guides 46 and 48, respectively, in which projections having a large width are formed. Four projections 47 are formed in the rod-shaped light guide 46 and two projections 49 are formed in the rod-shaped light guide 48. By enlarging or reducing the width of the projection, the amount of emitted light can be adjusted depending on the shape of the light emitting surface or the illumination angle.

FIG. 4D shows a rod-shaped light guide 50 provided with a projection 51 by forming the rod-shaped light guide 50 such that the cross section thereof perpendicular to the longitudinal direction has the shape of a fungus. The projection 51 formed as a result of the fungus shape also allows the light initially totally reflected by the light emitting surface to be emitted from the light emitting surface with the result that the amount of emitted light is increased. Since the fungus shape can be easily made, workability and yield of the extrusion molding step are improved.

FIG. 4E shows a rod-shaped light guide 52 in which the end of a projection 53 is formed to have an arc cross section. By forming the end of the projection 53 to have an arc cross section, the light reflected by the light emitting surface can be suitably captured, reflected toward the light emitting surface, and emitted outside from the light emitting surface, by configuring the radius of curvature properly. By forming the end of the projection 53 to have an arc cross section, the end is prevented from being chopped so that yield is improved.

FIG. 4F shows a rod-shaped light guide 54 having a rectangular cross section. In this rod-shaped light guide 54, one of the longitudinally extending, lateral surfaces opposite to each other and containing the shorter edges of the rod-shaped light guide 54 represents a scattering pattern surface 54a and the other of the opposite lateral surfaces represents a light emitting surface 54b. Two lateral surfaces 54c and 54d between the scattering pattern surface 54a and the light emitting surface 54b are respectively provided with projections 55a and 55b having a rectangular cross section. Like the first projection 40 and the second projection 42 of the rod-shaped light guide 26 described with reference to FIGS. 1-3, the projections 55a and 55b are formed to capture the light reflected by the light emitting surface 54b and reflect the light toward the light emitting surface 54b so that the light emitting surface 54b emits the light outside. In this case, too, light can be effectively used without using a light guide case with the result that the amount of emitted light is increased. Since the number of components or the number of assembly steps is reduced, inexpensive rod-shaped light guides can be provided.

We conducted a simulation comparing the variations shown in FIGS. 4A-4E as to the amount of emitted light. Given that the amount of emitted light in a configuration shown in FIG. 4H in which the rod-shaped light guide 56 is loaded in the light guide case 58 represents 100%, the amount of light emitted from the rod-shaped light guide 56 according to the comparative example shown in FIG. 4G represents about 60%. The amount of light emitted from the rod-shaped light guide 44 shown in FIG. 4A represents about 90%, the amount of light emitted from the rod-shaped light guide 46 shown in FIG. 4B represents about 85%, the amount of light emitted from the rod-shaped light guide 48 shown in FIG. 4C represents about 77%, and the amount of light emitted from the rod-shaped light guide 50 is about 75%, and the amount of light emitted from the rod-shaped light guide 52 shown in FIG. 4E is about 80%. This demonstrates that all of the rod-shaped light guides of FIGS. 4A-4E are capable of increasing the amount of emitted light as compared to the rod-shaped light guide 56 of FIG. 4G.

Given above is an explanation of the present invention based on an embodiment. The embodiment is intended to be illustrative only and it will be obvious to those skilled in the art that various modifications to constituting elements and processes could be developed and that such modifications are also within the scope of the present invention.

In the described embodiment, the projection is provided in both lateral surfaces of the rod-shaped light guide. Alternatively, the projection may be provided only in one of the lateral surfaces. As in the described embodiment, the amount of emitted light can be increased. In the described embodiment, the projections are provided to be symmetrical with respect to the central plane of the rod-shaped light guide extending in the longitudinal direction. Alternatively, the projections may be provided to be asymmetrical depending on the read area of the document or the layout of the rod-shaped light guide so that the distribution of the amount of light is asymmetrical.

What is claimed is:

1. A rod-shaped light guide that reflects light incident on an end face thereof in the interior of the rod shaped light guide and emits the light outside from a light emitting surface provided to extend in the longitudinal direction, comprising:
    a scattering pattern surface provided to be opposite to the light emitting surface and operative to scatter the light incident on the end face;
    a lateral surface provided between the light emitting surface and the scattering pattern surface; and
    a projection provided to project from the lateral surface, capture the light reflected by the light emitting surface, reflect the light toward the light emitting surface, and cause the light to be emitted outside from the light emitting surface,
    wherein the projection is formed to project at an angle toward the scattering pattern surface away from a direction of the light emitting surface.

2. The rod-shaped light guide according to claim 1, wherein
    the projection is formed such that the cross section thereof perpendicular to the longitudinal direction of the rod-shaped light guide is uniform over the entire length thereof in the longitudinal direction.

3. The rod-shaped light guide according to claim 1, wherein the projection is formed to reflect light in a direction different from the direction in which the light is incident on the projection.

4. The rod-shaped light guide according to claim 1, wherein
    the projection is formed so that the reflected light is incident on the light emitting surface at an incidence angle smaller than the critical angle of the light emitting surface.

5. The rod-shaped light guide according to claim 1, wherein
    the projection is formed such that the cross section thereof perpendicular to the longitudinal direction of the rod-shaped light guide is rectangular.

6. The rod-shaped light guide according to claim 1, wherein
    a plurality of projections are provided in the lateral surface.

7. The rod-shaped light guide according to claim 6, wherein
    the plurality of projections are symmetrical with respect to the central plane of the rod-shaped light guide extending in the longitudinal direction.

8. An image reading device comprising:
    the rod-shaped light guide according to claim 1 for illuminating a document with light;
    a lens array operative to condense the light emitted by the rod-shaped light guide and reflected by the document; and
    a line image sensor operative to receive the light condensed by the lens array.

* * * * *